United States Patent Office 3,410,760
Patented Nov. 12, 1968

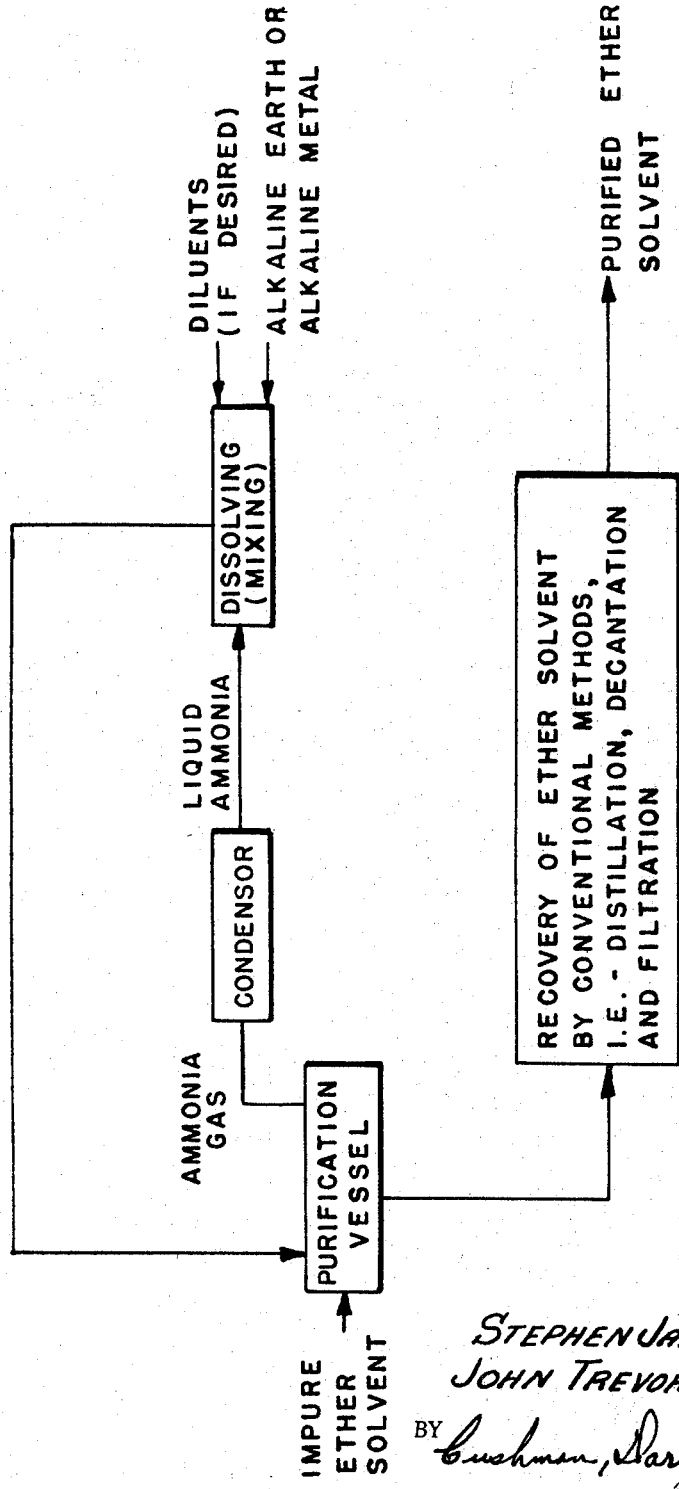

3,410,760
RECOVERY OF ETHERS BY CONTACT WITH AMMONIA AND AN ALKALINE METAL IN A LIQUID MEDIUM
Stephen James Craig and John Trevor de Souza, Runcorn, England, assignors to Imperial Chemical Industries Limited, London, England, a corporation of Great Britain
Filed July 29, 1966, Ser. No. 568,765
Claims priority, application Great Britain, Aug. 6, 1965, 33,731/65
15 Claims. (Cl. 203—29)

ABSTRACT OF THE DISCLOSURE

There is provided a process for the purification of an ether solvent wherein the solvent is contacted with a solution of an alkaline earth or alkali metal in a liquid medium containing ammonia. Thereafter, the purified solvent is recovered from the mixture by conventional methods such as distillation, decantation and filtration.

---

This invention relates to a purification process and more particularly to a process for the purification of solvents, such as ethers, which are unreactive towards alkaline earth and alkali metals.

It is known to remove reactive impurities from ethers by treatment of the ether with lithium aluminum hydride, but this method of purification can be extremely hazardous, several fires having been reported (see for example Chem. and Ind., April 18, 1964, page 665). It is also known to purify ethers by treatment with solid sodium metal, but we have found that this process is slow and does not remove some of the less reactive impurities from the ether.

We have now found an improved method of purifying solvents such as ethers which is both safe and rapid.

Thus according to our invention we provide an improved process for the purification of a solvent (which does not itself react with the solution of the metal) which comprises interaction of the solvent with a solution of an alkaline earth or alkali metal in a liquid medium containing ammonia, and isolation of the resulting purified solvent. The use of a solution of the metal ensures intimate contact between the metal and the solvent to be purified.

Examples of compounds which may be purified by our process are hydrocarbons and ethers. Ethers and especially ethers containing more than one ether linkage are often made from the corresponding alcohol or glycol and therefore contain small proportions of the parent hydroxy compound (e.g., glycol or alcohol) which are difficult to remove by physical methods such as distillation. Our present invention is particularly useful for the removal of impurities which react with the metal used, and is particularly suitable for the removal of hydroxy compounds such as alcohols, glycols and water from such ethers.

Metals suitable for use in our process are calcium, potassium, and preferably sodium. The solution of the metal or metals preferably contains the metal and liquid ammonia only, but may, if the separation of diluents at a later stage in the process is not unduly inconvenient, contain one or more diluents. Suitable diluents are, in general, those which can be separated easily from the solvent to be purified.

The process of our invention may be carried out very simply by mixing the solution of the metal in the liquid medium containing ammonia with the solvent to be purified and then allowing the ammonia to evaporate. We have found a convenient time to maintain the solvent in contact with the solution of metal in the liquid medium containing ammonia is from about 0.5 to 2.5 hours but shorter or longer times may be used if desired. At the end of the period of interaction the mixtures may be warmed to assist in the removal of ammonia and the solvent may then, if desired, be refluxed to complete the reaction between the metal (which at this stage has been precipitated by removal of ammonia) and the impurities.

We prefer to use approximately equal proportions of the solution containing liquid ammonia and of the solvent to be purified but other proportions may also be used. If the proportion of liquid ammonia is too small the metal will tend to be precipitated on mixing with the solvent and if the proportion of liquid ammonia is too great the bulk of liquid will tend to create difficulties in handling and/or in recovery of the ammonia. We have found that the concentration of the metal in the liquid medium containing ammonia may conveniently be between about 1% and 5% by weight. The optimum concentration of metal will of course depend on the level of the impurities in the solvent to be purified and on the proportion of the solution containing liquid ammonia which is used.

The purified solvents may be recovered from the reaction mixture by conventional methods for example by fractional distillation, decantation or filtration, and we have found that particularly in the case of ethers, such as the dimethyl ether of diethylene glycol, it is desirable to store the purified solvent in the absence of air and water.

The process is illustrated by, but not limited to, the schematic flow diagram of the figure. As illustrated by the flow diagram, the ammonia gas removed from the interacting mixture may be condensed and recycled to the process.

The invention is illustrated, but in no way limited by reference to the following examples in which the parts and percentages are by weight.

Example 1

Sodium (3 gms.) was dissolved in liquid ammonia (400 mls.) in a 1 litre three necked flask with stirring. A precooled argon purge was passed through the apparatus and diethylene glycol dimethyl ether (300 mls.) was added. The resulting blue solution was stirred vigorously and the ammonia allowed to evaporate. The sodium eventually came out of solution and the mixture was then distilled. A small amount of distillate came over at low temperatures and was rejected. The fraction boiling at 162° C.–163° C. (225 mls.) was collected as pure diethylene glycol dimethyl ether and gave only one peak on gas-liquid chromatographic analysis. A brown solid material, which is thought to be sodium hydroxide and sodium salts of alcohols present in small amounts in the diethylene glycol dimethyl ethers, was left in the flask after the distillation.

Example 2

Sodium (2.5 gms.) was dissolved in liquid ammonia (300 mls.) in a 1 litre three necked flask which was purged with a stream of precooled argon. Tetrahydrofuran (250 mls.) was added from a tap funnel and the resulting blue solution was stirred for 1.25 hrs. At the end of this time the flask was heated to remove ammonia and the tetrahydrofuran was then distilled, the fraction boiling at about 64.5° C. being collected. A sample of this pure tetrahydrofuran gave only one peak on gas-liquid chromatographic analysis. Some solid material was left in the flask at the end of the distillation.

Example 3

The procedure of Example 2 was repeated using dimethoxyethane instead of tetrahydrofuran. The fraction of dimethoxyethane distilling at about 64° C. was collected and a sample of this purified dimethoxyethane was found to give only one peak of gas-liquid chromatographic analysis.

Example 4

Calcium (4.5 gms.) was dissolved in liquid ammonia (300 mls.) in a 1 litre three necked flask with stirring. A precooled argon purge was passed through the apparatus and diethylene glycol dimethyl ether (250 mls.) was added. The resulting blue solution was stirred vigorously for 1 hour after which time the flask was heated to remove ammonia. When most of the ammonia had been removed the mixture was fractionally distilled, the fraction boiling in the range 162–163° C. being collected as pure diethylene glycol dimethyl ether. Gas-liquid chromatographic analysis of the pure diethylene glycol dimethyl ether demonstrated that the purified ether contained less impurities than the untreated ether, but contained more impurities than a sample of the ether which had been treated in like manner with a solution of sodium in liquid ammonia.

What we claim is:

1. Process for the purification of an ether solvent which comprises the contacting and interaction of the said solvent with a solution of a member selected from the group consisting of an alkaline earth and alkali metal in a liquid medium containing ammonia, which solution does not react with the said solvent, and thereafter recovering the resulting purified solvent.

2. Process as claimed in claim 1 wherein the ether contains more than one ether linkage.

3. Process as claimed in claim 1 wherein the impurity to be removed from the solvent is a hydroxy compound.

4. Process as claimed in claim 3 wherein an alcohol, or water is removed from the solvent.

5. Process as claimed in claim 1 wherein the metal is sodium.

6. Process as claimed in claim 1 wherein the metal is calcium or potassium.

7. Process as claimed in claim 1 wherein the liquid medium is liquid ammonia.

8. Process as claimed in claim 1 wherein the solution of the metal in the liquid medium containing ammonia is mixed with the solvent to be purified and the ammonia is subsequently removed by evaporation.

9. Process as claimed in claim 1 wherein the solvent is maintained in contact with the solution of the metal for from 0.5 to 2.5 hours.

10. Process as claimed in claim 1 wherein ammonia is removed from the interaction mixture by evaporation and the solvent is subsequently vaporized, condensed and returned to the interaction mixture as a reflux.

11. Process as claimed in claim 1 wherein approximately equal proportions of the metal solution and of the solvent to be purified are used.

12. Process as claimed in claim 1 wherein the concentration of the metal in the liquid medium containing ammonia is between about 1% and 5% by weight.

13. Process as claimed in claim 1 wherein the purified solvent is recovered by fractional distillation.

14. Process as claimed in claim 4 wherein the alcohol is a glycol.

15. A process for the purification of a solvent selected from the group consisting of dimethylene glycol dimethyl ether, tetrahydrofuran, dimethoxyethane, comprising contacting the said solvent with a solution of a member selected from the group consisting of an alkaline earth and alkali metal in a liquid medium containing ammonia, which solution does not react with the said solvent, and thereafter recovering the solvent from the impurities by distillation.

References Cited

UNITED STATES PATENTS

| | | | |
|---|---|---|---|
| 1,466,435 | 8/1923 | Hammond | 203—29 |
| 2,912,366 | 11/1959 | Kauder | 203—32 |
| 3,155,657 | 11/1964 | Bedoit | 260—616 |

FOREIGN PATENTS 219,273   10/1924   Great Britain.

WILBUR L. BASCOMB, JR., Primary Examiner.